United States Patent [19]

Kinkel

[11] 3,808,547

[45] Apr. 30, 1974

[54] AUTOMATIC GAIN CONTROL CIRCUIT

[75] Inventor: John F. Kinkel, Newport Beach, Calif.

[73] Assignee: North American Rockwell Corporation, El Segundo, Calif.

[22] Filed: Dec. 18, 1972

[21] Appl. No.: 316,330

[52] U.S. Cl. .................... 330/85, 330/110, 330/146

[51] Int. Cl. .................... H03g 3/24

[58] Field of Search ....... 330/85, 86, 110, 143, 146; 331/141

[56] References Cited

UNITED STATES PATENTS

| | | | |
|---|---|---|---|
| 2,472,256 | 6/1949 | Mak | 330/109 X |
| 2,281,644 | 5/1942 | Weathers | 330/110 X |
| 2,820,903 | 1/1958 | Roulston et al. | 331/141 X |
| 3,516,002 | 6/1970 | Hillis | 330/85 X |
| 3,157,841 | 11/1964 | Gilbert | 331/183 X |

*Primary Examiner*—Herman Karl Saalbach
*Assistant Examiner*—James B. Mullins
*Attorney, Agent, or Firm*—H. Fredrick Hamann; G. Donald Weber, Jr.

[57] ABSTRACT

An automatic gain control circuit utilizing a voltage sensitive impedance in a negative feedback loop to control the operating parameters of the circuit.

6 Claims, 2 Drawing Figures

AUTOMATIC GAIN CONTROL CIRCUIT

BACKGROUND OF THE INVENTION

In many electronics systems, it is necessary to maintain a relatively constant signal level at some point within the system. This constant signal level must be maintained in spite of the relatively large changes in the system input signal level, line voltage fluctuations and the like.

There are many known circuits or systems for accomplishing the automatic gain control (AGC) function. Typical of the known systems is the Rosencrans patent, entitled Inverse Feedback Amplifier, U.S. Pat. No. 2,284,102, issued on May 26, 1942. This patent includes a negative feedback loop associated with an amplifier network.

Other patents such as the Alexander et al patent, entitled Electronic Circuit for Arithmetic Operations, U.S. Pat. No. 3,215,824 and the Harkenrider et al. patent, entitled Electronic Proportioning Circuit Including a Light Control Means in the Amplifier Circuit, U.S. Pat. No. 3,383,617 are pertinent to this art. Other patents, such as the Roberts patent, entitled Automatic Volume Control Circuits, U.S. Pat. No. 2,248,785 and the Van Slooten et al. patent, entitled Low Frequency Amplifier, U.S. Pat. No. 2,323,634 show control circuits having incandescent lamps in the feedback loops thereof. The Roberts patent specifies a tungsten filament for one of the incandescent lamps in the feedback loop. Also, the Campbell patent, entitled Constant Level, Photon Controlled Amplifier Circuit, U.S. Pat. No. 3,409,840 shows a photoresistor and a suitable illuminating source and a feedback control path.

However, each of these patents represents a system which has certain inherent difficulties. For example, the Roberts and Van Slooten patents relate to volume compressors and expanders wherein, typically, an output signal amplitude proportional to the square root of the input amplitude signal is produced. There is no provision for a relatively constant output signal over a wide range of input signals. These and other shortcomings are found in the systems of the cited art.

Therefore, an automatic gain control circuit of improved capabilities is required.

SUMMARY OF THE INVENTION

In the automatic gain control circuit of this invention, a variable impedance device is connected in a simplified negative feedback path to supply a feedback signal to a control device wherein the input signal is operated upon to produce a substantially constant output signal.

In one embodiment, the variable impedance device may be represented by an incandescent lamp which forms a portion of a bridge in the feedback path.

BRIEF DESCRIPTION OF A PREFERRED EMBODIMENT

Figure 1:
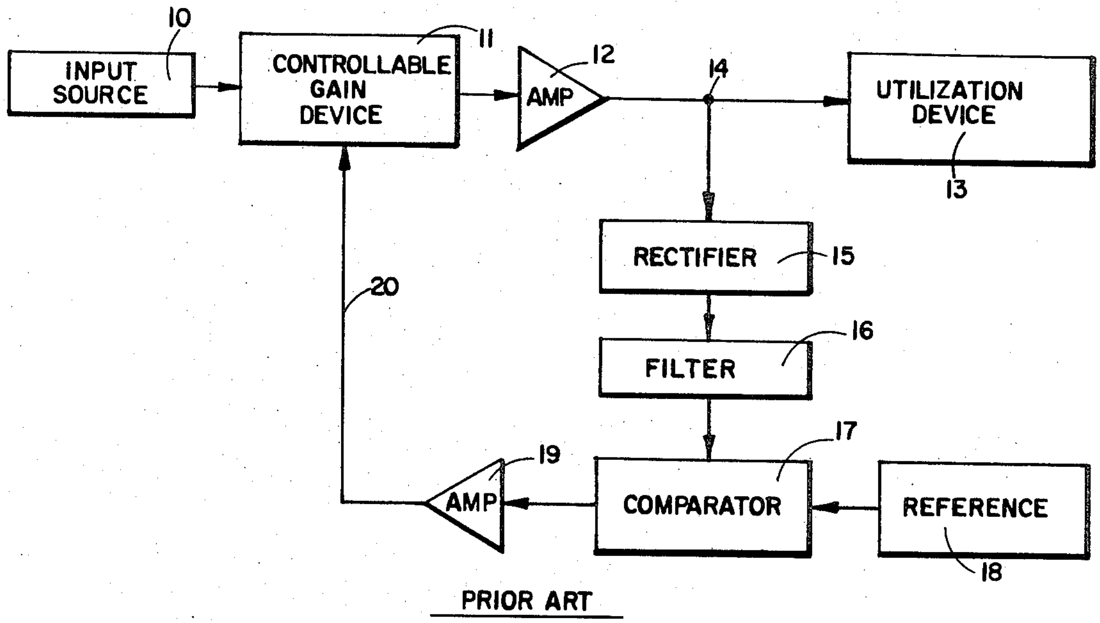
PRIOR ART FIG. 1
FIG. 1 is a block diagram of an automatic gain control circuit known in the art.

Referring now to FIG. 1, there is shown an automatic gain control circuit (AGC) which is known in the art.

In this AGC, an input source 10 is connected to controllable gain device 11. The source may be of any suitable type which tends to supply input signals having a fluctuating range or amplitude. The controllable gain device may be any suitable type of device of this general character many of which are known in the art. The output terminal from controllable gain device 11 is connected to one input terminal of amplifier 12. An output terminal of amplifier 12 is connected via node 14 to utilization device 13. Utilization device 13 may be any type of device which is to receive signals from input source 10 to operate thereon.

In addition, node 14 (i.e., the output terminal of amplifier 12) is connected to an input terminal of rectifier circuit 15, which is further connected to filter circuit 16. In many embodiments, rectifier circuit 15 and filter circuit 16 may be combined in a single component. The output terminal of filter 16 is connected to one input terminal of comparator 17. Another input terminal of comparator 17 is connected to the output terminal of a suitable reference source 18. Typically, reference source 18 may provide a DC voltage level or the like.

The output terminal of comparator 17 is connected to one input of amplifier 19. The output terminal of amplifier 19 is connected via line 20 to another input terminal of controllable gain device 11. The signal on line 20 effects control of the operation of controllable gain device 11.

The operation of the circuit is described briefly. Input source 10 supplies a signal to controllable gain device 11. This signal is operated upon by device 11 and supplied to amplifier 12 for appropriate amplification. The signal from amplifier 12 is supplied to utilization device 13 via node 14. In addition, a portion of the output signal from amplifier 12 is supplied to comparator 17 via the rectifier 15-filter 16 circuit. This signal portion is compared with a DC reference voltage by comparator 17. The error signal, if any, is supplied to an amplifier 19. The amplified error signal is supplied to controllable gain device 11 along line 20. Thus, an output voltage level differing from the voltage established by reference 18 will result in a greater or lesser gain at controllable gain device 11. Consequently, the output signal produced by device 11 is maintained at nearly the desired value. As a result, the output signal at node 14 is substantially controlled wherein a substantially constant DC reference signal supplied by source 18 results in a nearly constant output signal level at utilization device 13 despite wide variations in the input signal level.

Figure 2:
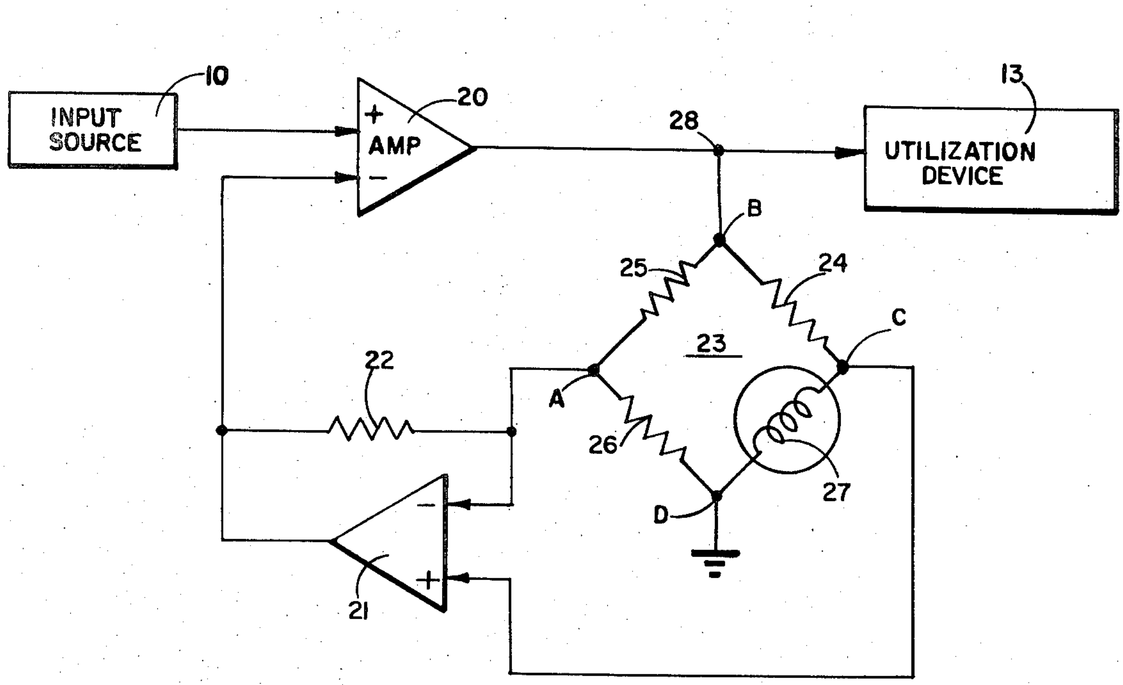
FIG. 2 is a partially block, partially schematic diagram of the circuit of the instant invention.

Referring now to FIG. 2, there is shown a partially block and partially schematic diagram of the circuit which forms the instant invention. Input source 10, which may be similar to the input source shown in FIG. 1, is connected to the plug or non-inverting input of operational amplifier 20. Operational amplifier 20 may be one of a large number of well known operational amplifiers generally available on the market. The output terminal of amplifier 20 is connected to utilization device 13 via node 28. Utilization device 13 may be similar to the utilization device shown in FIG. 1. Node 28, which corresponds to node 14 of the circuit shown in FIG. 1, is connected to node B of bridge circuit 23. One terminal of each of resistors 24 and 25 is connected to node B.

The other end of resistor 25 is connected to node A. Resistor 26 is connected between node A and node D. Node D is connected to a suitable reference potential such as ground. Another terminal of resistor 24 is connected to node C. An incandescent lamp 27 is connected between nodes C and D. In a preferred embodiment, lamp 27 includes a tungsten filament. Resistors 25 and 26 are substantially identical resistors.

Node C is connected to the non-inverting input of operational amplifier 21. Node A of bridge circuit 23 is connected to the inverting input of amplifier 21. Feedback resistor 22 is connected from the inverting input of amplifier 21 to the output terminal thereof. The output terminal of amplifier 21 is connected to the inverting input of amplifier 20.

In the circuit shown and described in FIG. 2, the controllable gain device, rectifier, filter and comparator of the circuit shown in FIG. 1 are essentially replaced by the single incandescent lamp 27. It is well known that the resistance of a tungsten filament lamp is an increasing function of the applied voltage.

Inasmuch as resistors 25 and 26 are substantially identical, the voltage at node A is, essentially, one-half the voltage applied at node B. The voltage at node A operates as a floating reference which is a direct function of the voltage at node B. However, inasmuch as the resistance of lamp 27 increases with an increasing voltage thereacross, the voltage at node C is a variable which is directly proportional to the voltage at nodes 28 and node B. The voltages at nodes A and C are applied to the input terminals of amplifier 21. Feedback resistor 22 of amplifier 21 is arranged or selected to provide a suitable gain characteristic for amplifier 21. The voltage difference supplied across the input terminals of amplifier 21 is operated upon thereby and a signal representative thereof is supplied to the inverting input of amplifier 20. In essence, if the voltage at node 28 varies, and falls outside of the prescribed limits assigned thereto, the voltage signal supplied by amplifier 21 operates as a negative feedback signal and changes the output signal from amplifier 20.

Briefly stated, if the voltage at node 28 increases, the resistance of lamp 27 increases. Conversely, if the voltage at node 28 decreases, the resistance of lamp 27 decreases. The actions of lamp 27 cause an increase or reduction in the negative feedback signal which is generated by a loop comprising bridge 23 and amplifiers 20 and 21. The negative feedback signal tends to alter the voltage level of the output signal at node 28 (and supplied to utilization device 13). Since the feedback is a negative feedback, which tends to react in the opposite direction from the output signal, the output signal generated by the circuit remains substantially constant within prescribed limits.

In addition, if an input signal is not applied, the output signal "locks-up" to a plus or minus voltage of a relatively low level due to DC coupling and positive feedback at low signals. The low level output signal produced during the "lock-up" situation can be useful for indicating the "lack of signal" condition at the input source. A suitable indicator (not shown) may be included in the circuit for this purpose.

Thus, there has been shown and described an automatic gain control circuit which offers good performance combined with extreme simplicity. The circuit utilizes an incandescent lamp in a bridge network in a feedback circuit. The circuit does not use photoresistive resistors in connection with the incandescent lamp, as one example of simplicity. Those skilled in the art will possibly conceive modifications to the subject circuit however, any such modifications which fall within the scope of this description are intended to be included therein. The scope of the invention is to be determined only by the appended claims.

Having thus described the preferred embodiment of the invention, what is claimed is:

1. An automatic gain control circuit comprising input means for supplying a signal which is subject to undesirable variation, amplifier means having an input terminal connected to receive said signal from said input means, output means connected to receive a signal from an output terminal of said amplifier means, a bridge network comprising a plurality of impedance means and having a plurality of nodes, at least one of said impedance means comprising an element the impedance of which increases as the voltage thereacross increases, one node of said bridge network connected to said output terminal of said amplifier means, the opposite node of said bridge network connected to a reference source, and difference amplifier means having a pair of input terminals connected to the opposing nodes of said bridge network which are intermediate said one node and said opposite node, said difference amplifier means having the output terminal thereof connected to an input terminal of said amplifier means.

2. The automatic gain control circuit recited in claim 1 wherein said element comprises the filament of a light bulb.

3. The automatic gain control circuit recited in claim 1 wherein said amplifier means includes a non-inverting input terminal connected to said input means and an inverting input terminal connected to said difference amplifier means.

4. The automatic gain control circuit recited in claim 1 wherein said bridge network and said difference amplifier means comprise feedback means which is a negative feedback circuit.

5. The automatic gain control circuit recited in claim 1 including feedback means connected between the output terminal of said difference amplifier means and one input terminal thereof.

6. The automatic gain control circuit recited in claim 1 wherein said element comprises a tungsten filament.

* * * * *

PO-1050
(5/69)

UNITED STATES PATENT OFFICE
CERTIFICATE OF CORRECTION

Patent No. 3,808,547 Dated April 30, 1974

Inventor(s) John F. Kinkel

It is certified that error appears in the above-identified patent and that said Letters Patent are hereby corrected as shown below:

Column 2, line 57, change "plug" to --plus--.

Signed and sealed this 1st day of October 1974.

(SEAL)
Attest:

McCOY M. GIBSON JR.
Attesting Officer

C. MARSHALL DANN
Commissioner of Patents